United States Patent [19]
Jones et al.

[11] Patent Number: 6,050,899
[45] Date of Patent: Apr. 18, 2000

[54] SEALING SYSTEM FOR A UNIVERSAL JOINT ASSEMBLY

[75] Inventors: Michael J. Jones, Boyertown; Michael J. Rogers, Wyomissing, both of Pa.

[73] Assignee: Neapco, Inc., Pottstown, Pa.

[21] Appl. No.: 09/079,727

[22] Filed: May 15, 1998

[51] Int. Cl.$^7$ ........................................ F16D 3/16
[52] U.S. Cl. .................. 464/131; 464/128; 277/565
[58] Field of Search ................... 464/7, 14, 11, 464/131, 128, 133; 277/573, 562, 565, 566, 560, 634, 635

[56] References Cited

U.S. PATENT DOCUMENTS

| | | | |
|---|---|---|---|
| 2,237,758 | 4/1941 | Kurzweil | 277/565 |
| 2,802,351 | 8/1957 | Anderson | 64/17 |
| 2,873,153 | 2/1959 | Haynie | 308/187.2 |
| 2,896,432 | 7/1959 | Hempel | 64/17 |
| 2,996,901 | 8/1961 | Kleinschmidt | 464/131 |
| 3,108,815 | 10/1963 | Haynie et al. | 277/565 |
| 3,138,942 | 6/1964 | Kayser | 64/17 |
| 3,200,615 | 8/1965 | Stokely | 64/17 |
| 3,306,683 | 2/1967 | Deuring | 308/187.2 |
| 3,592,022 | 7/1971 | Stokely | 64/17 |
| 3,594,050 | 7/1971 | Gothberg | 308/187.2 |
| 3,606,352 | 9/1971 | Lutz | 277/32 |
| 4,116,091 | 9/1978 | Welschof | 64/17 |
| 4,371,177 | 2/1983 | Bahr et al. | 277/560 |
| 4,512,672 | 4/1985 | Olschewski et al. | 277/565 |
| 4,515,574 | 5/1985 | Mazziotti | 464/131 |
| 4,710,150 | 12/1987 | Mangiavacchi | 464/14 |
| 4,874,349 | 10/1989 | Gall | 464/131 |
| 4,932,923 | 6/1990 | Thompson | 464/131 |
| 5,165,700 | 11/1992 | Stoll et al. | 277/562 |
| 5,169,160 | 12/1992 | Gaskill | 277/560 |
| 5,188,564 | 2/1993 | Keller | 464/14 |
| 5,230,660 | 7/1993 | Warnke | 464/146 |
| 5,288,272 | 2/1994 | Marriott et al. | 464/128 |
| 5,588,915 | 12/1996 | Smith | 464/14 |
| 5,597,356 | 1/1997 | Rieder | 277/565 |
| 5,716,277 | 2/1998 | Reynolds | 464/131 |

FOREIGN PATENT DOCUMENTS

| | | | |
|---|---|---|---|
| 1195688 | 11/1959 | France | 464/131 |
| 848715 | 9/1960 | Germany . | |
| 3115659 | 11/1982 | Germany | 464/128 |
| 4041498 | 6/1992 | Germany . | |
| 62-151629 | 7/1987 | Japan | 464/131 |

*Primary Examiner*—Lynne H. Browne
*Assistant Examiner*—Greg Binda
*Attorney, Agent, or Firm*—Woodcock Washburn Kurtz Mackiewicz & Norris LLP

[57] ABSTRACT

A two piece sealing system for a universal joint assembly. A lubricant seal adapted to prevent the leakage of lubricant between the trunnion and bearing cup of a universal joint wherein the trunnion has a cylindrical portion merging into an outwardly flaring arcuate base portion, the seal including an elastomer body bonded to the interior of a stiffening ring. The body of the seal has two lips that extend from a thin section as two symmetrical cantilever protrusions each having a fully radiused tip, the line of symmetry for the symmetrical lips running from a point near the intersection of the trunnion diameter and the trunnion arcuate radius toward the center of the trunnion arcuate radius, the thin section above the two cantilevered protrusions allowing both lips of the seal to pivot about the line of symmetry, one of the lips contacting the journal trunnion diameter and being directed toward the interior of the bearing cup to maintain the level of the bearing lubricant, the other lip contacting the trunnion arcuate radius and is directed away from the interior of the bearing cup to deny the entrance of environmental contaminants, the combination of the thin section and the symmetric lips allowing the interference points of the seal to float. The outer boot seal formed between the bearing cap and the outer cylindrical friction surface of an associated trunnion includes an outer seal of elastomeric material having a tubular portion and an inwardly extending annular portion at one end. The tubular portion has structure for maintaining contact with the outside diameter of the bearing cup and the inwardly extending annular portion has a stiffening ring molded into the elastomer to provide the required strength and stiffness to retain the outer boot seal on the outer cylindrical surface of the trunnion by way of a press fit.

2 Claims, 2 Drawing Sheets

SEALING SYSTEM FOR A UNIVERSAL JOINT ASSEMBLY

BACKGROUND OF THE INVENTION

The present invention relates to a sealing system for a universal joint assembly and particularly to a two piece sealing system.

Universal joint assemblies are well known in the art and in general include a cross member having a body portion having four trunnions extending outwardly from the body portion. Each of the trunnions includes an outer cylindrical friction surface extending outwardly from the body portion and an outer cylindrical journal surface extending outwardly from the friction surface and an arcuate surface interconnecting the journal surface and the friction surface. Each of the trunnions is provided with a bearing cup having an open end and an inner bearing surface. The bearing cups are disposed about the trunnion such that the inner bearing surface of the bearing cup is disposed coaxially about the outer cylindrical journal surface of the trunnion. Needle bearings are disposed between the inner bearing surface of the bearing cup and the outer journal surface of the trunnion for permitting rotation of the bearing cup relative to the trunnion.

Two piece sealing systems for universal joint assemblies are well known in the art. Examples of such systems are shown in U.S. Pat. No. 4,874,349 and U.S. Pat. No. 5,588,915. In such systems a seal is provided at the open end of the bearing cup for engaging the surface of the trunnion and designed to keep the lubricant within the bearing cup. The second piece of the seal, sometimes referred to as the seal guard or dust guard, extends over the open end of the bearing cup and engages the trunnion friction surface to prevent the entry of dirt and other contaminants into the interior of the universal joint. While the sealing systems of the prior art have been satisfactory, in many respects they have left something to be desired in regard to simplicity of construction and effectiveness.

SUMMARY OF THE INVENTION

It is an object of the present invention to provide an improved sealing system for a universal joint assembly where the sealing system is of the two piece type including an improved universal joint seal and an improved outer boot seal. It is a further object of this invention to provide an improved sealing system wherein the outer boot seal is assembled separately on the outer cylindrical friction surface of an associated trunnion in a universal joint assembly prior to assembly of the bearing cup and its lubricant seal.

In accordance with one aspect of the present invention there is provided an improved sealing system for a universal joint assembly including a cross member having a body portion having at least one trunnion extending outwardly from the body portion, the trunnion including an outer cylindrical friction surface extending outwardly from the body portion and an outer cylindrical journal surface extending outwardly from the friction surface and an arcuate surface interconnecting the journal surface and the friction surface. A bearing cup is provided having an open end and an inner bearing surface, the bearing cup being disposed about the trunnion such that the inner bearing surface of the bearing cup is disposed coaxially about the outer cylindrical journal surface of the trunnion and needle bearing means are disposed between the inner bearing surface of the bearing cup and the outer journal surface of the trunnion for permitting rotation of the bearing cup relative to the trunnion.

The improved sealing system includes a universal joint seal composed of a molded elastomeric body bonded to the interior of a stiffening ring, the seal being retained in the inside diameter of the bearing cup by means of a press fit between the inner diameter of the bearing cup and the outside diameter of the stiffening ring. The body of the seal has two lips that extend from a thin section as two symmetrical cantilever protrusions each having a fully radiused tip, the line of symmetry from the symmetrical lips running from a point near the intersection of the trunnion journal surface diameter and the trunnion arcuate radius toward the center of the outer cylindrical surface arcuate. The thin section above the two cantilevered protrusions allows both lips of the seal to pivot about the line of symmetry, one of the lips contacting the outer cylindrical surface journal and being directed toward the internal bearing surfaces to maintain the level of the bearing lubricant, the other lip contacting the arcuate surface and being directed away from the internal bearing surfaces to deny the entrance of environmental contaminants, the combination of the thin section and the symmetric lips allowing the interference points of the seal to float. The sealing system further includes an outer boot seal of elastomeric material having a tubular portion and an inwardly extending annular portion at one end, the tubular portion having structure for maintaining contact with the outside diameter of the bearing cup and the inwardly extending annular portion having a stiffening ring molded into the elastomer to provide the required strength and stiffness to retain the outer boot seal on the outer cylindrical friction surface of the trunnion by way of a press fit.

In another aspect of the invention there is provided a lubricant seal adapted to prevent the leakage of lubricant between the trunnion and bearing cap of a universal joint and wherein the trunnion has an outer cylindrical journal surface merging into an outwardly flaring arcuate surface. The seal comprises an elastomer body bonded to the interior of the stiffening ring, the body of the seal having two lips that extend from a thin section as two symmetrical cantilever protrusions each having a fully radiused tip, the line of symmetry for the symmetrical lips running from a point near the intersection of the outer cylindrical journal surface and the surface arcuate toward the center of the arcuate surface the thin section above the two cantilevered protrusions allowing both lips of the seal to pivot about the line of symmetry. One of the outer cylindrical lips contacts the journal surface and being directed toward the interior of the bearing cup to maintain the level of the bearing lubricant, the other lip contacting the arcuate surface and is directed away from the interior of the bearing cup to deny entrance of environmental contaminants, the combination of the thin section and the symmetric lips allowing the interference points of the seal to float.

In another aspect of the invention there is provided an outer boot seal for forming a seal between a bearing cup and the outer cylindrical friction surface of an associated trunnion. The seal comprises an outer seal of elastomeric material having a tubular portion and an inwardly extending annular portion at one end. The tubular portion has structure for maintaining contact with the outside diameter of the bearing cup and the inwardly extending annular portion has a stiffening ring molded into the elastomer to provide the required strength and stiffness to retain the outer boot seal on the outer cylindrical friction surface of the trunnion by way of a press fit.

For other objects and advantages of the invention, reference is to be had to the following drawings and description.

BRIEF DESCRIPTION OF THE INVENTION

DETAILED DESCRIPTION OF THE PREFERRED EMBODIMENT

Figure 1:
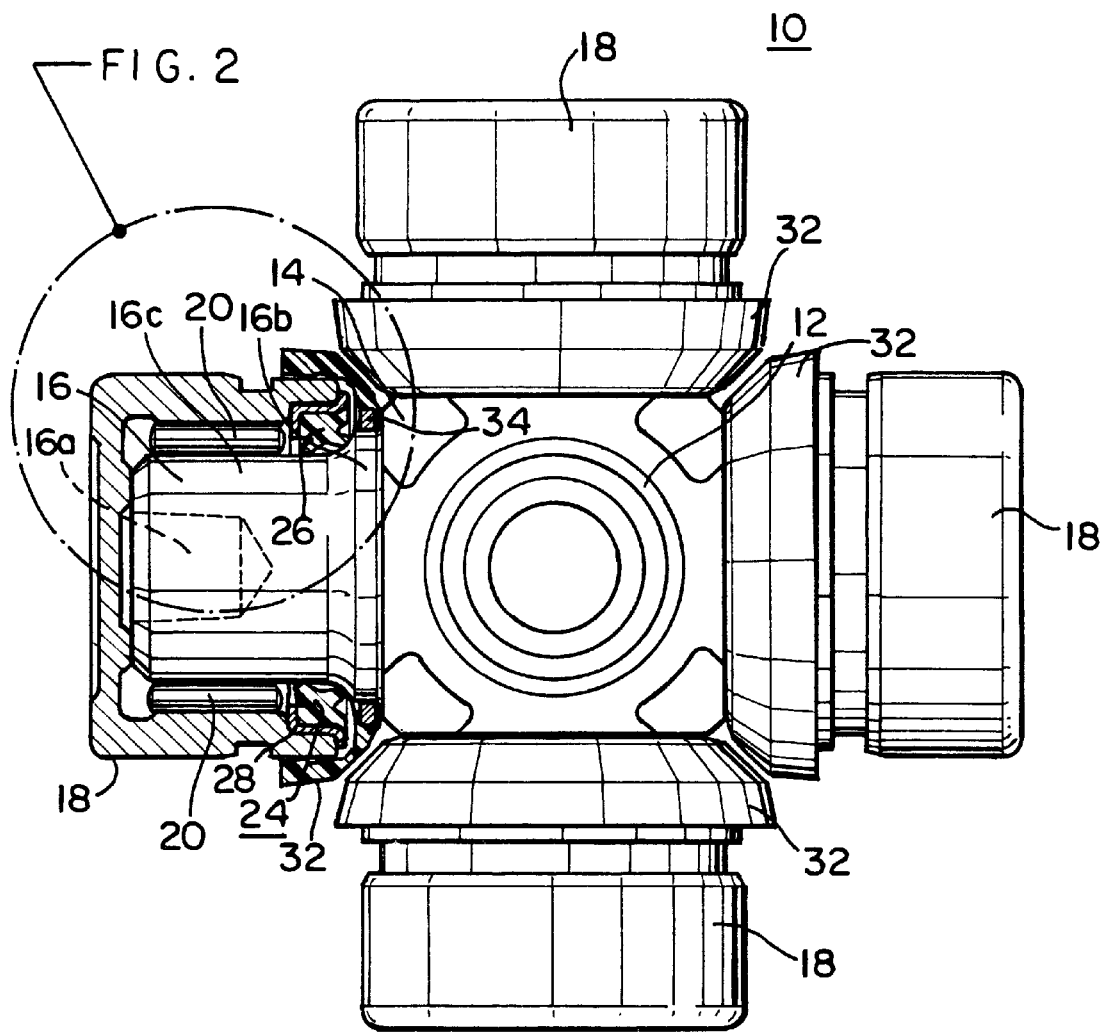
FIG. 1 is an elevational view partially in cross section of a cross member for a universal joint and an improved sealing system in accordance with the present invention.

Referring to FIG. 1 there is illustrated a universal joint 10 with improved sealing system 10 in accordance with the present invention. The universal joint includes a cross member 12 having a body portion 14 having four trunnions 16, only one of which is seen in FIG. 1. The trunnions 16 are all identical and each includes a lubricant reservoir 16a. Each of the trunnions 16 includes an outer cylindrical friction surface 16b extending outwardly from the body portion 14 and an outer cylindrical journal surface 16c extending outwardly from the friction surface 16b and an arcuate surface 16d interconnecting the journal surface 16c and the friction surface 16b. Each of the trunnions 16 is provided with a bearing cup 18 having an open end 18a and an inner bearing surface 18b. The bearing cups 18 are disposed about the trunnions of the cross member such that the inner bearing surface 18b about the bearing cup is disposed coaxially about the outer cylindrical journal surface 16c of the trunnion. A plurality of needled bearings 20 are disposed between the inner bearing surface 18b of the bearing cup and the outer cylindrical journal surface 16c of the trunnion 16 for permitting rotation of the bearing cup 18 relative to the trunnion 16.

Figure 2:
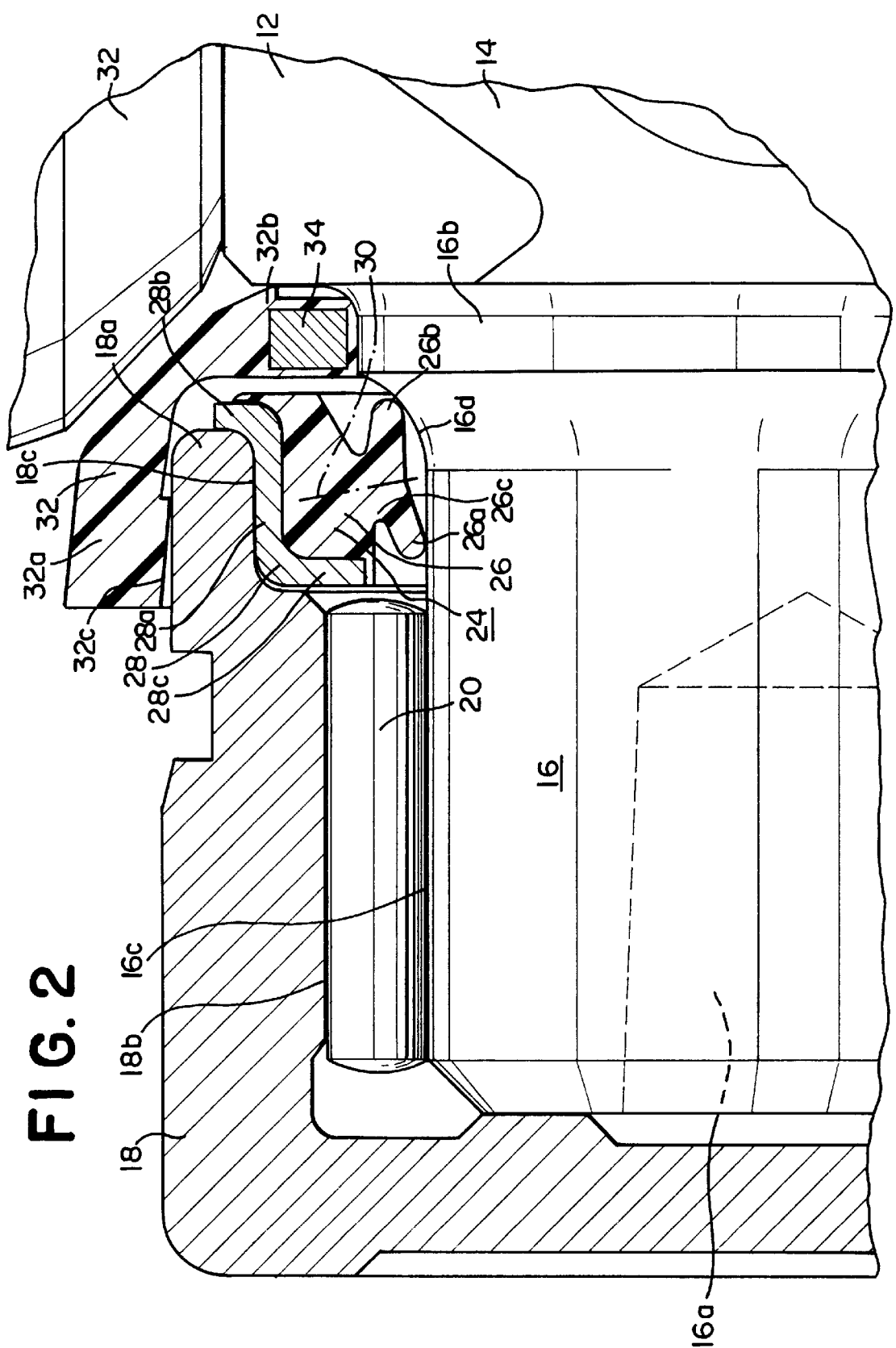
FIG. 2 is an enlarged fractional view of the bullseye portion of the cross sectional structure illustrated in FIG. 1.

The improved two piece sealing system of the present invention includes a universal joint seal 24 composed of a molded elastomer body 26 bonded to the interior of a stiffening ring 28. The stiffening ring 28, as best seen in FIG. 2, is in the form of a cup shape member including a cylindrical portion 28a and an outwardly extending annular rim 28b and an inwardly extending annular rim 28c. The seal 24 is inserted into the open end 18a of the bearing cup 18 and is retained in the inside diameter 18c of the open end of the bearing cup 18 by means of a press fit between the inside diameter 18c of the bearing cup and the outside diameter of section 28a of the stiffening ring 28. It will be noted in FIG. 2 that the outwardly extending annular is portion 28b engages the open end 18a of the bearing cup and the inwardly extending annular portion 28c extends over the ends of the needle bearings 20.

The elastomeric body 26 of the seal 24 is provided with two lips 26a and 26b that extend from a thin section 26c as two symmetrical cantilever protrusions each having a fully radiused tip. The line of symmetry 30 for the symmetrical lips 26a and 26b runs from a point near the intersection of the trunnion outer cylindrical journal surface 16c and the trunnion arcuate surface 16d toward the center of the trunnion arcuate surface. The thin section 26c above the two cantilevered protrusions 26a and 26b allow both lips of the seal 24 to pivot about the line of symmetry 30, one of the lips 26a contacting the journal trunnion diameter 16c and being directed toward the internal bearing surfaces to maintain the level of the bearing lubricant, and the other lip 26b contacting the trunnion arcuate surface 16d and is directed away from the internal bearing surfaces to deny entrance of environmental contaminants. The combination of the thin section 26c and the symmetric lips 26a and 26b allow the interference points of the seal 24 to float.

The second portion of the improved sealing system is the outer boot seal 32 which is formed of elastomeric material having a tubular portion 32a and an inwardly extending annular portion 32b at one end. The tubular portion 32a is provided with lip structure 32c for maintaining contact with the outer diameter of the bearing cup 18. The inwardly extending annular portion 32b is provided with a stiffening ring 34, preferably of metal, molded into the elastomer to provide the required strength and stiffness to retain the outer boot seal 32 on the outer cylindrical surface 16b of the trunnion 16 by way of a press fit.

In the assembly of the improved sealing system on the universal joint assembly, the outer boot seal 32 is first assembled onto each of the trunnions 16 by pressing the end of the boot seal 32 containing the stiffening ring 34 onto the outer cylindrical friction surfaces 16b. The universal joint seals 24 are then inserted into the open end 18a of the bearing cups 18 with the cylindrical section 28a of the stiffening ring 28 forming a press fit with the inside diameter 18c of the bearing cup 18. After the bearing cups 18 with the needle bearings 20 and universal joint seal 24 have been assembled as shown in FIG. 2, the bearing cup and seal assemblies are then assembled onto the trunnions 16 of the cross member. After assembly, the lip 26a of the seal 24 will contact the journal trunnion diameter 16c and the other lip 26b will contact the trunnion arcuate radius 16d. The tubular portion 32a of the outer boot seal will engage the outside diameter of the bearing cup 18 as shown in FIG. 2.

The combination of the elastomeric thin section and symmetric lips in the improved universal joint seal of the present invention allows the interference points of the seal to "float". This feature lends itself to ease in design modifications. In prior art designs which utilize set interference points on the journal trunnion diameter and trunnion radius, any modifications to the trunnion diameter or trunnion radius also require the seal to be modified. The improved outer boot seal of the present invention being separately installed lends itself for use with universal joint seals of other lip configurations.

While a preferred embodiment of the invention has been described and illustrated, it will be understood that further modifications may be made without departing from the spirit and scope of the invention as set forth in the appended claims.

What is claimed is:

1. In a universal joint assembly comprising a cross member having a body portion having at least one trunnion extending outwardly from said body portion, said trunnion including an outer cylindrical friction surface extending outwardly from said body portion and an outer cylindrical journal surface extending outwardly from said friction surface and an arcuate surface interconnecting said journal surface and said friction surface; a bearing cup having an open end and an inner bearing surface, said bearing cup being disposed about said trunnion such that said inner bearing surface of said bearing cup is disposed coaxially about said outer cylindrical journal surface of said trunnion; and needle bearing means disposed between said inner bearing surface of said bearing cup and said outer journal surface of said trunnion for permitting rotation of said bearing cup relative to said trunnion;

the improvement of a sealing system comprising:
a universal joint seal composed of a molded elastomer body bonded to the interior of a stiffening ring, said seal being retained in the inside diameter of the bearing cup by means of a press fit between the inside diameter of the bearing cup and the outside diameter of the stiffening ring, said body of said seal having two lips that extend from a thin section as two symmetrical cantilever protrusions each having a fully radiused tip, the line of symmetry for the symmetrical lips running from a point near the intersection of the outer cylindrical journal surface and the arcuate surface toward the center of the arcuate surface, the thin section above the two cantilevered protrusions allowing both lips of the seal to pivot about the line of symmetry, one of the lips contacting the outer cylindrical journal surface and being directed toward the internal bearing surface to maintain the level of the bearing lubricant, the other lip contacting the arcuate surface and is directed away from the internal bearing surface to deny the entrance of environmental contaminants, the combination of the thin section and the symmetric lips allowing the interference points of the seal to float; and an outer boot seal of elastomeric material having a tubular portion and an inwardly extending annular portion at one end, said tubular portion having structure for maintaining contact with the outside diameter of the bearing cup and said inwardly extending annular portion having a stiffening ring molded into the elastomer to provide the required strength and stiffness to retain the outer boot seal on the outer cylindrical friction surface of the trunnion by way of a press fit.

2. A lubricant seal adapted to prevent the leakage of lubricant between a trunnion and bearing cup of a universal joint and wherein the trunnion has an outer cylindrical journal surface merging into an outwardly flaring arcuate surface, said seal comprising an elastomer body bonded to the interior of a stiffening ring, said body of said seal having two lips that extend from a thin section as two symmetrical cantilever protrusions each having a fully radiused tip, the line of symmetry for the symmetrical lips running from a point near the intersection of the outer cylindrical journal surface and the arcuate surface toward the center of the arcuate surface, the thin section above the two cantilevered protrusions allowing both lips of the seal to pivot about the line of symmetry, one of the lips contacting the outer cylindrical journal surface and being directed toward the interior of the bearing cup to maintain the level of the bearing lubricant the other lip contacting the arcuate surface and is directed away from the interior of the bearing cup to deny the entrance of environmental contaminants, the combination of the thin section and the symmetric lips allowing the interference points of the seal to float.

* * * * *

UNITED STATES PATENT AND TRADEMARK OFFICE
CERTIFICATE OF CORRECTION

PATENT NO. : 6,050,899
DATED : April 18, 2000
INVENTOR(S) : Michael J. Jones and Michael J. Rogers It is certified that error appears in the above-identified patent and that said Letters Patent is hereby corrected as shown below:

Col. 2, line 9, "trunnion journal" should be deleted and insert --outer cylindrical --

Col. 2, line 10, "diameter" should be deleted.

Col. 2, line 10, "trunnion" should be deleted.

Col. 2, line 10, delete "radius" and insert --surface--
Col. 2, line 11, delete "outer cylindrical" and move the word "arcuate" to before "surface".
Col. 3, line 7, delete "10"

Col. 3, line 41, delete "is"

Signed and Sealed this

Thirteenth Day of March, 2001

Attest:

NICHOLAS P. GODICI

*Attesting Officer*  *Acting Director of the United States Patent and Trademark Office*